Patented Oct. 16, 1934

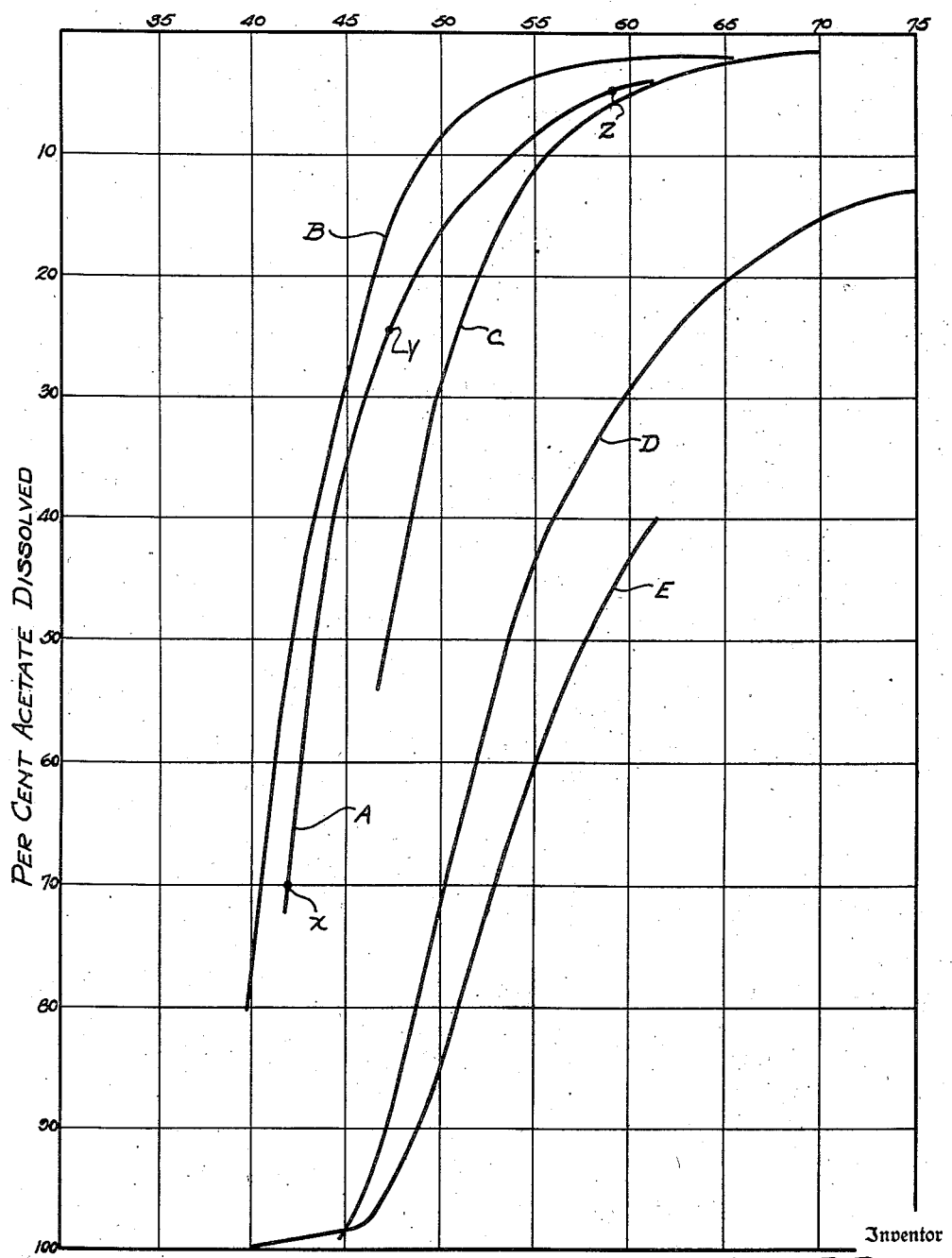

1,976,748

UNITED STATES PATENT OFFICE 1,976,748

SAFETY GLASS

Joseph D. Ryan and William J. Arner, Toledo, Ohio, assignors to Libbey-Owens-Ford Glass Company, Toledo, Ohio, a corporation of Ohio Application March 30, 1932, Serial No. 602,098

10 Claims. (Cl. 49—81)

The present invention relates to the art of safety glass manufacture.

Safety glass, sometimes called laminated glass, broadly speaking, is composed of two sheets of glass with an interposed layer of plastic material bonded to the inner surfaces of the glass to provide a composite structure. The customary plastic material heretofore used in the making of safety glass is pyroxylin plastic. Pyroxylin plastic is ordinarily formed by colloidizing nitro-cellulose with camphor.

For some years past, it has been the aim of many in the art to develop a satisfactory process of using cellulose acetate plastic because cellulose acetate plastic is more stable to light and heat energy than the common forms of pyroxylin plastic. It has been found, however, that the bonding of cellulose acetate plastic to glass presents even greater difficulties than the bonding of pyroxylin plastic to glass.

We have attempted to make safety glass using sheets of cellulose acetate plastic obtained from various sources of supply, trying various bonding agents, and by far the majority of attempts to produce safety glass with such plastic have been completely unsatisfactory, although in some cases reasonably good bonding was obtained.

Likewise, various bonding agents have been made by dissolving cellulose acetate in suitable solvents and plasticizers and the results obtained with these bonding materials have been erratic to the extent that none of them could be depended upon in the commercial production of safety glass.

However, as satisfactory results were obtained at times with some of the cellulose acetate, solvents and plasticizer mixtures, we became convinced that if the proper care were exercised in the selection of the cellulose acetate used in the bonding material, dependable results could be obtained.

We have therefore developed a process whereby cellulose acetate stock can be classified into cellulose acetate that can be satisfactorily used for bonding purposes. The classification of the various acetate stocks bought on the open market into the variety or kind which will satisfactorily bond cellulose acetate plastic and glass laminations and those which give absolutely no adhesion when used as bonding agents for cellulose acetate plastic can be accomplished by determining their solubility in water-acetone solutions.

We have carried out a large number of experiments on various types and grades of cellulose acetate supplied to us by cellulose acetate manufacturers, and we find that the different types of cellulose acetate can be roughly divided into two classes with respect to their solubility in solutions of water and acetone. For example, we have found that recent samples of cellulose acetate obtained from one source of supply, regardless of the viscosity and acetyl number, when dispersed in cellulose acetate plasticizers or solvents and used as an adhesive between glass and cellulose acetate plastic, gave no adhesion between the cellulose acetate plastic and the glass surfaces, whereas with a few of the other types of cellulose acetate obtained from other sources of supply, when dispersed in suitable plasticizers or high boiling point, low vapor pressure solvents, and applied to the glass surfaces in the form of an adhesive, gave excellent adhesion when the glass plastic sandwiches were subjected to the application of heat and pressure.

We have discovered that the cellulose acetates which are unsatisfactory for bonding purposes between glass and cellulose acetate plastic are less soluble in solutions of acetone and water than are the cellulose acetates which will satisfactorily bond the cellulose acetate plastic and glass.

The drawing is in the form of a chart showing the curves which we have plotted, which represent the solubility of some of the cellulose acetates in different mixtures of water and acetone as the solvent. The abscissa or the horizontal represent the composition of the solvent used (acetone and water). The ordinate represent the percent of the cellulose acetate dissolved in any of the particular water-acetone solvents.

The division of the different types of acetates is clearly shown by their solubility curves in the chart. Data for these curves were obtained by attempting to dissolve approximately 5% by weight of the various cellulose acetates in solutions of acetone and water, varying the proportions of acetone and water from one extreme of 35 parts water and 65 parts acetone to 75 parts water and 25 parts acetone by weight, and agitating the mixtures of cellulose acetate and water-acetone solutions for twenty-four hours at room temperature. Our experimental work has shown us that an agitation of twenty-four hours of such solutions is sufficient to bring about equilibrium between the undissolved and the dissolved cellulose acetate.

At the end of the twenty-four hour period of agitation, the undissolved portion of the cellulose acetate was separated from the soluble portion of the cellulose acetate by centrifuging the mixture and decanting supernatant liquid which contains the soluble portion of the acetate. The amount of cellulose acetate in solution was then determined by carefully measuring aliquot portions of the supernatant liquid, evaporating this solution to dryness, and then weighing the cellulose acetate residue. By repeating the above procedure, using as a solvent different water-acetone ratios, solubility data were obtained from which the solubility curves were drawn.

Results of our experimental work clearly indicate that a particular variety of cellulose acetate, characterized by its solubility curve A in the figure, will give satisfactory results as an adhesive for cellulose acetate plastic and glass laminations when dispersed in cellulose acetate plasticizers and high boiling point, low vapor pressure solvent or mixtures thereof in the approximate concentration of 5% to 75% cellulose acetate.

Our experimental research work has further shown that any cellulose acetate, characterized by its solubility curve falling to the right of curve A in the drawing, will give excellent bonding qualities for cellulose acetate plastic and glass surfaces when applied as above outlined.

It will be noted that the curve A is established by three points: namely (1) an acetate of which at least 70% is soluble in a solution made up by mixing water and acetone in the ratio of 42 parts water to 58 parts acetone by weight. This point is designated by the letter X in the drawing; (2) at least 25% soluble in a water-acetone solution consisting of 47 parts water to 53 parts acetone by weight. This point is designated by the letter Y in the drawing; (3) and at least 5% of the acetate is soluble in a water-acetone solution consisting of 59 parts water, and 41 parts of acetone by weight. This point is designated by the letter Z in the drawing.

The acetate characterized by the curve B in the drawing falls to the left of the curve A and therefore cannot be used with satisfactory results as a bonding agent between glass and cellulose acetate plastic. On the other hand, the acetates characterized by the curves C, D and E, falling to the right of the curve A in the drawing, will give satisfactory results as a bonding agent between glass and cellulosic acetate plastic.

We have found that all cellulose acetates characterized by curves falling to the right of the curve A in the drawing can be satisfactorily employed when dissolved or dispersed in plasticizers or high boiling point, low vapor pressure solvents therefor as a bonding material between glass and cellulose acetate plastic. Our experience shows that the types of cellulose acetates now obtainable on the market, and falling to the right of the curve A, are very much in the minority.

We have found that any of the commercial sheets of cellulose acetate plastic now obtainable on the market can be bonded to glass when a cellulose acetate falling to the right of the curve A in the drawing is dissolved or dispersed in a plasticizer or high boiling point, low vapor pressure solvent for said cellulose acetate when the treated laminations are subjected to the action of heat and pressure.

Probably dimethyl phthalate serves as the best plasticizer for this purpose, but triacetin, ethyl lactate, benzyl alcohol, benzyl acetate, and diethyl phthalate or other plasticizers can be used. Obviously, mixtures or combinations of these and other plasticizers and high boiling point, low vapor pressure solvents can be used. However, it is highly desirable that only such plasticizers be employed that will be stable in the finished safety glass and will not tend to adversely affect the cellulose acetate plastic.

The concentration of the cellulose acetate in the adhesive mixture, as pointed out above, can be varied from 5% to 75%, and as a matter of fact, the percentage of cellulose acetate included will be dependent more or less upon the method of application used for depositing the bonding material on the laminations.

For example, if the bonding material is to be applied to the glass or to the cellulose acetate plastic mechanically, as by means of a depositing roller, approximately 5 parts cellulose acetate dispersed in 95 parts of a suitable plasticizer is a desirable concentration. On the other hand, if the bonding material is to be sprayed upon the laminations, the ratio of cellulose acetate to plasticizer can be increased and may be desirable, for example, approximately 75 parts of cellulose acetate and 25 parts of a suitable plasticizer dissolved in suitable volatile solvents to give the proper spraying consistency gives very satisfactory results. It will of course be understood that in the event volatile solvents are employed, these will be evaporated before bonding of the laminations together.

While it may be desirable in some cases to apply the cellulose acetate bonding material directly upon the surfaces of the glass sheets, nevertheless we have found that equally satisfactory results can be obtained when applying the cellulose acetate bonding material to the cellulose acetate plastic sheet itself, and then assembling such coated plastic layer between properly cleaned glass sheets to form a sandwich which is subsequently subjected to the action of heat and pressure.

We have obtained excellent results by subjecting the glass-plastic sandwiches above described to an approximate temperature of 300° F. and a pressure ranging from 40 to 200 pounds per square inch for a period of from six to eight minutes.

While our improved bonding mixture for safety glass has been described in connection with the joining of cellulose acetate plastic and glass to produce safety glass, nevertheless it will be understood that the invention contemplates the use of said bonding material in the joining of glass and any cellulose ester layer.

We claim:

1. As a new article of manufacture, a sheet of laminated glass including two sheets of glass and an interposed sheet of cellulose ester plastic bonded together to provide a composite structure by a mixture of cellulose acetate of which at least 70% is soluble in a solution made up by mixing water and acetone in the ratio of 42 parts water to 58 parts acetone by weight, and a plasticizer for the cellulose acetate.

2. As a new article of manufacture, a sheet of laminated glass including two sheets of glass and an interposed sheet of cellulose ester plastic bonded together to provide a composite structure by a mixture of cellulose acetate of which at least 25% is soluble in a water acetone solution consisting of 47 parts water to 53 parts acetone by weight and a plasticizer for the cellulose acetate.

3. As a new article of manufacture, a sheet of laminated glass including two sheets of glass and an interposed sheet of cellulose ester plastic bonded together to provide a composite structure by a mixture of cellulose acetate of which at least 5% of the acetate is soluble in a water-acetone solution consisting of 59 parts water and 41 parts of acetone by weight, and a plasticizer for said cellulose acetate.

4. As a new article of manufacture, a sheet of laminated glass including two sheets of glass and an interposed sheet of cellulose ester plastic bonded together to provide a composite structure by a mixture of an acetate of which at least 70% is soluble in a solution made up by mixing water and acetone in the ratio of 42 parts water to 58 parts acetone by weight, at least 25% of which is soluble in a water-acetone solution, consisting of 47 parts of water to 53 parts of acetone by weight, and of which at least 5% is soluble in a water-acetone solution consisting of 59 parts water and 41 parts of acetone by weight, and a plasticizer for said cellulose acetate.

5. The process of producing safety glass comprising two sheets of glass and an interposed sheet of cellulose ester plastic, which consists in coating the surface of at least one of the components of glass and cellulose ester plastic with a mixture of cellulose acetate of which at least 70% is soluble in a solution made up by mixing water and acetone in the ratio of 42 parts water to 58 parts acetone by weight and a plasticizer for said cellulose acetate, assembling the cellulose ester plastic sheet between the sheets of glass, and then pressing the assembled set of sheets.

6. The process of producing safety glass comprising two sheets of glass and an interposed sheet of cellulose ester plastic, which consists in coating the surface of at least one of the components of glass and cellulose ester plastic with a mixture of cellulose acetate, of which at least 25% is soluble in a water-acetone solution consisting of 47 parts water to 53 parts acetone by weight and a plasticizer for said cellulose acetate, assembling the cellulose ester plastic sheet between the sheets of glass, and then pressing the assembled set of sheets.

7. The process of producing safety glass comprising two sheets of glass and an interposed sheet of cellulose ester plastic, which consists in coating the surface of at least one of the components of glass and cellulose ester plastic with a mixture of cellulose acetate, of which at least 5% of the acetate is soluble in a water-acetone solution consisting of 59 parts water and 41 parts of acetone by weight and a plasticizer for said cellulose acetate, assembling the cellulose ester plastic sheet between the sheets of glass, and then pressing the assembled set of sheets.

8. The process of producing safety glass comprising two sheets of glass and an interposed sheet of cellulose ester plastic, which consists in coating the surface of at least one of the components of glass and cellulose ester plastic with a mixture of cellulose acetate of which at least 70% is soluble in a solution made up by mixing water and acetone in the ratio of 42 parts water to 58 parts acetone by weight, at least 25% of which is soluble in a water-acetone solution consisting of 47 parts of water to 53 parts of acetone by weight, and of which at least 5% is soluble in a water-acetone solution consisting of 59 parts water and 41 parts acetone by weight and a plasticizer for said cellulose acetate, assembling the cellulose ester plastic sheet between the sheets of glass, and then pressing the assembled set of sheets.

9. The process of producing safety glass comprising two sheets of glass and an interposed sheet of cellulose ester plastic, which consists in coating the surface of at least one of the components of glass and cellulose ester plastic with a mixture of cellulose acetate of which at least 70% is soluble in a solution made up by mixing water and acetone in the ratio of 42 parts water to 58 parts acetone by weight, at least 25% of which is soluble in a water-acetone solution consisting of 47 parts water to 53 parts of acetone by weight, and of which at least 5% is soluble in a water-acetone solution consisting of 59 parts water and 41 parts of acetone by weight and dimethyl phthalate, assembling the cellulose ester plastic sheet between the sheets of glass, and then pressing the assembled set of sheets.

10. The process of producing safety glass comprising two sheets of glass and an interposed sheet of cellulose ester plastic, which consists in coating the surface of at least one of the components of glass and cellulose ester plastic with a mixture of cellulose acetate of which at least 70% is soluble in a solution made up by mixing water and acetone in the ratio of 42 parts water to 58 parts acetone by weight, at least 25% of which is soluble in a water-acetone solution consisting of 47 parts water to 53 parts of acetone by weight, and of which at least 5% is soluble in a water-acetone solution consisting of 59 parts water and 41 parts of acetone by weight and a high boiling point, low vapor pressure solvent for the cellulose acetate, assembling the cellulose ester plastic sheet between the sheets of glass, and then pressing the assembled set of sheets.

JOSEPH D. RYAN.
WILLIAM J. ARNER.